(12) United States Patent
Dion et al.

(10) Patent No.: US 8,808,850 B2
(45) Date of Patent: Aug. 19, 2014

(54) WATER RESISTANT INTUMESCENT FIRE RETARDANT COATING

(71) Applicant: Arclin, Roswell, GA (US)

(72) Inventors: Andrew N Dion, Springfield, OR (US); Mark Anderson, Springfield, OR (US); Dave Gibson, Springfield, OR (US); Ron Huizingh, Springfield, OR (US)

(73) Assignee: Arclin, Roswell, GA (US)

( * ) Notice: Subject to any disclaimer, the term of this patent is extended or adjusted under 35 U.S.C. 154(b) by 0 days.

(21) Appl. No.: 13/660,856

(22) Filed: Oct. 25, 2012

(65) Prior Publication Data

US 2013/0101839 A1   Apr. 25, 2013

Related U.S. Application Data

(60) Provisional application No. 61/551,167, filed on Oct. 25, 2011.

(51) Int. Cl.
| | | |
|---|---|---|
| C09K 21/14 | (2006.01) | |
| B32B 27/42 | (2006.01) | |
| B32B 27/16 | (2006.01) | |
| B32B 27/08 | (2006.01) | |
| C09J 7/02 | (2006.01) | |

(52) U.S. Cl.
USPC ............ 428/323; 428/526; 428/528; 524/96; 524/416

(58) Field of Classification Search
USPC .............................. 428/526, 528; 524/416, 96
See application file for complete search history.

(56) References Cited

U.S. PATENT DOCUMENTS

| | | | |
|---|---|---|---|
| 4,945,015 A | 7/1990 | Milner et al. | |
| 5,173,515 A | 12/1992 | von Bonin et al. | |
| 5,182,049 A | 1/1993 | von Bonin | |
| 5,387,655 A | 2/1995 | Aslin | |
| 5,430,081 A | 7/1995 | Ohmae et al. | |
| 5,443,894 A | 8/1995 | Pollock et al. | |
| 5,498,466 A | 3/1996 | Navarro et al. | |
| 5,596,029 A | 1/1997 | Goebelbecker et al. | |
| 5,962,603 A | 10/1999 | Qureshi et al. | |
| 5,968,669 A | 10/1999 | Liu et al. | |
| 6,084,008 A | 7/2000 | Liu | |
| 6,194,057 B1 * | 2/2001 | Schennum et al. | 428/211.1 |
| 6,207,085 B1 | 3/2001 | Ackerman | |
| 6,228,914 B1 * | 5/2001 | Ford et al. | 524/124 |
| 6,566,433 B1 | 5/2003 | Ochsner et al. | |
| 7,063,330 B2 | 6/2006 | Kubota et al. | |
| 7,214,332 B2 | 5/2007 | Bemis et al. | |
| 7,331,400 B2 | 2/2008 | Rowen | |
| 7,482,395 B2 | 1/2009 | Mabey et al. | |
| 7,867,615 B2 | 1/2011 | Kubota et al. | |
| 8,178,449 B2 | 5/2012 | La Vietes et al. | |
| 2002/0171068 A1 * | 11/2002 | Erismann et al. | 252/606 |
| 2003/0125447 A1 * | 7/2003 | Hoch et al. | 524/495 |
| 2004/0127621 A1 | 7/2004 | Drzal et al. | |
| 2006/0029835 A1 * | 2/2006 | Kim et al. | 428/913.3 |
| 2006/0148965 A1 | 7/2006 | Drzal et al. | |
| 2006/0148966 A1 | 7/2006 | Drzal et al. | |
| 2008/0108266 A1 * | 5/2008 | Kajander et al. | 442/334 |
| 2008/0166484 A1 | 7/2008 | Smith | |
| 2010/0173109 A1 * | 7/2010 | Okabe et al. | 428/36.91 |

FOREIGN PATENT DOCUMENTS

| | | |
|---|---|---|
| EP | 2 208 594 A1 | 7/2010 |
| GB | 2 359 308 A | 8/2001 |
| GB | 2 417 030 A | 2/2006 |
| JP | 1987192442 * | 8/1987 |

OTHER PUBLICATIONS http://www.gclabequipment.com/sieve_conversion_chart.pdf (2013).*
Abstract JP 1987-192442 (1987).*

* cited by examiner

*Primary Examiner* — Samir Shah
(74) *Attorney, Agent, or Firm* — Birch, Stewart, Kolasch & Birch, LLP

(57) ABSTRACT

A fire retardant intumescent coating composition is disclosed, which includes expandable graphite, an aromatic polyamine resin, and a phosphorous-containing compound. An overlay for applying to a wood substrate is also disclosed, which includes a core layer comprising a substrate and a resin composition, a top layer on one side of the core layer comprising the fire retardant intumescent coating composition, and an optional bottom layer on the opposite side of the core layer from the top layer. A process of forming the overlay is also disclosed, which includes applying the resin composition to the core layer substrate to form a resinated core layer, and applying a coating composition on the resinated core layer, directly or indirectly, to form the top layer; wherein the coating composition comprises expandable graphite, an aromatic polyamine resin, and a phosphorous-containing compound.

22 Claims, No Drawings

WATER RESISTANT INTUMESCENT FIRE RETARDANT COATING

FIELD OF THE INVENTION

This invention provides a fire retardant intumescent coating with superior water resistance. The coating can be applied to an overlay for use in wood products to give a high degree of fire resistance.

BACKGROUND OF THE INVENTION

Intumescent flame retardant systems have been used in some materials for many years. Traditional intumescent flame retardant systems normally contain three components that are the basic elements to form a char: a source of acid, gas, and carbon. Commercially available intumescent flame retardant systems usually included ammonium polyphosphate (acid donor), pentaerythritol (carbon donor), and melamine (blowing agent). A material containing such a flame retardant system will form a char layer at the surface during combustion to protect the material.

Traditional flame retardant intumescent coatings currently available on the market are intended for interior use. The chemicals used to create the coating are water soluble, which allows the coating to dissolve or reduce performance when subjected to water. For factory applied intumescent coatings, it is unrealistic to assume that the panels will never be exposed to water. Shipping, storage, and rain delays at construction sites provide opportunities for water exposure.

SUMMARY OF THE INVENTION

An object of this invention is to provide a fire retardant intumescent coating composition, comprising expandable graphite, an aromatic polyamine resin, and a phosphorous-containing compound.

The coating composition may also include morpholine, a catalyst, chlorinated paraffins, and/or a latex.

The aromatic polyamine resin of the coating composition may be a melamine resin. The catalyst of the coating composition may be paratoluene sulfonic acid.

The expandable graphite of the coating composition may comprise particles that can pass through a 500 mesh screen, preferably a 325 mesh screen, more preferably a 100 mesh screen, and most preferably a 50 mesh screen. The expandable graphite of the coating composition may have an expansion volume of at least 15 mL/g, preferably an expansion volume of 100-500 mL/g, and more preferably an expansion volume of 100-200 mL/g.

The aromatic polyamine resin is present in the coating composition in a concentration of 20-60 wt %, preferably about 40-45 wt %.

The expandable graphite is present in the coating composition in a concentration of 10-50 wt %, preferably about 15-25 wt %.

A further object of this invention is to provide an overlay for applying to a wood substrate, comprising a core layer comprising a substrate and a resin composition, a top layer on one side of the core layer comprising the fire retardant intumescent coating composition described above, and an optional bottom layer on the opposite side of the core layer from the top layer.

The core layer substrate may be a lignocellulosic material or a glass substrate. When the core layer substrate is the lignocellulosic material, the lignocellulosic material may be paper that is impregnated with the resin composition which comprises at least one selected from the group consisting of a phenolic resin and an acrylic resin. The core layer may also be a glass mat saturated with the resin composition which comprises at least one selected from the group consisting of a phenolic resin and an acrylic resin.

The bottom layer of the overlay may be an adhesive for binding to the wood substrate.

The top layer of the overlay may have at least 150 gsm graphite as measured when the top layer is dry, preferably about 200-220 gsm graphite as measured when the top layer is dry.

Another object of this invention is to provide a process of forming the overlay described above, comprising applying the resin composition to the core layer substrate to form a resinated core layer, and applying a coating composition on the resinated core layer, directly or indirectly, to form the top layer; wherein the coating composition comprises expandable graphite, an aromatic polyamine resin, and a phosphorous-containing compound.

The resinated core layer may be formed by impregnating paper with a resin composition comprising at least one selected from the group consisting of a phenolic resin and an acrylic resin or by saturating a glass mat with a resin composition comprising at least one selected from the group consisting of a phenolic resin and an acrylic resin. The top layer may have a dry coating weight of at least 100 gsm, preferably a dry coating weight of about 180-220 gsm, more preferably a dry coating weight of about 200 gsm.

Yet another object of this invention is to provide a construction material for a building or dwelling, comprising a wood substrate in direct contact with the overlay described above.

DETAILED DESCRIPTION OF THE PREFERRED EMBODIMENTS

This invention provides a fire retardant intumescent coating composition to the surface of a substrate while providing superior water resistance. The coating composition comprises expandable graphite, an aromatic polyamine resin, and a phosphorous-containing compound. The coating composition may also include morpholine, a catalyst, chlorinated paraffins, a latex, water, and/or other components.

Expandable Graphite

Expandable graphite decreases thermal conductivity and provides flame retardation. Expandable graphite responds to high heat and flames by forming individual units of self-expansion, which allows the expandable graphite to protect the underlying substrate from flame breakthrough.

The expandable graphite is available in various grades, and performance is affected by the particle size and the expansion volume. A 325 mesh small particle size with an expansion volume of 15-20 ml/g provides minimal intumescent properties when subjected to a flame. The preferred expandable graphite is 50-100 mesh with an expansion volume of 100-200 ml/g.

Types of expandable graphite useful in this invention are listed in Table 1.

TABLE 1

| Grade | Starting Expansion Temperature (° C.) | Expansion Volume (ml/g) | Particle Size (Mesh Size) |
|---|---|---|---|
| SYZR1001 | 150 | 20-50 | 100 |
| SYZR1003 | 300 | 50-80 | 100 |
| SYZR-3252 | 200 | 15-20 | −325 |
| SYZR-2002 | 200 | 20-60 | −200 |

TABLE 1-continued

| Grade | Starting Expansion Temperature (° C.) | Expansion Volume (ml/g) | Particle Size (Mesh Size) |
|---|---|---|---|
| SYZR1002 | 200 | 100-200 | +100 |
| SYZR802 | 200 | 150-250 | +80 |
| SYZR502 | 200 | 180-200 | +50 |
| SYZR502FP | 200 | 180-200 | +50 |
| SYZR501 | 150 | 200-300 | +50 |
| SYZR321 | 150 | 250-300 | +32 |

*Particle Size means mesh size, not real particle size
*− = 80% through. + = 80% remaining The expandable graphite may comprise particles that can pass through a 500 mesh screen. Preferably, the expandable graphite may comprise particles that can pass through a 325 mesh screen. More preferably, the expandable graphite may comprise particles that can pass through a 100 mesh screen. Even more preferably, the expandable graphite may comprise particles that can pass through a 50 mesh screen. As a range, the expandable graphite may comprise particles that can pass through a 30-325 mesh screen.

The expandable graphite may have an expansion volume of at least 15 mL/g. Preferably, the expandable graphite may have an expansion volume of 100-500 mL/g. More preferably, the expandable graphite may have an expansion volume of 100-200 mL/g.

The expandable graphite may be present in a concentration of 10-50 wt %. Preferably, the expandable graphite may be present in a concentration of about 15-25 wt %. More preferably, the expandable graphite may be present in a concentration of 17-20 wt %.

Aromatic Polyamine Resin

In addition to the fire retardant property of the aromatic polyamine resin, the aromatic polyamine resin also provides excellent water resistance and coating hardness. Herein, the term "resin" has the same meaning as the term "polymer."

Preferably, the resin is a thermoset resin.

The aromatic polyamine resin may include phenolics, epoxies or epoxides, aminos, silicons, urea formaldehyde, melamine formaldehyde, phenol formaldehyde resin, melamine reinforced urea formaldehyde resin, polyacrylic latex resin, isocyanate reinforced urea formaldehyde resin, resorcinol formaldehyde resin, isocyanate resin, and combinations and co-polymerizations thereof. The aromatic polyamine resin is most preferably a melamine formaldehyde resin.

The aromatic polyamine resin may be contained in an amount of 20-60 wt % of the coating composition. Preferably, the aromatic polyamine resin may be contained in an amount of 30-50 wt %. More preferably, the aromatic polyamine resin is about 40-45 wt %.

Phosphorous-Containing Compound

The phosphorous-containing compound is used as a flame retardant.

The phosphorous-containing compound may be ammonium phosphate, amine phosphate, melamine phosphate, triphenyl phosphate, monoammonium phosphate, ammonium polyphosphate, and combinations thereof. Preferably, the phosphorous-containing compound is ammonium polyphosphate (APP).

The phosphorous-containing compound may be contained in the coating composition in the amount of 1-30 wt %. Preferably, the phosphorous-containing compound may be contained in the coating composition in the amount of 5-25 wt %. More preferably, the phosphorous-containing composition may be contained in the coating composition in the amount of 14-17 wt %.

Morpholine

Morpholine is used as a buffer to extend the pot life of the resin mixture.

Morpholine may be contained in the coating composition in the amount of 0-6 wt %. Preferably, morpholine may be contained in the coating composition in the amount of 2-4 wt %. More preferably, morpholine may be contained in the coating composition in the amount of 2.5-3.5 wt %.

Catalyst

The catalyst accelerates the curing speed of the aromatic polyamine resin.

The catalyst may be perchloric acid, hydriodic acid, hydrobromic acid, sulfuric acid, hydrochloric acid, nitric acid, sulfurous acid, phosphoric acid, nitrous acid, sulfonic acid, hydrochloric acid, sulphuric acid, phosphoric acid, formic acid, acetic acid maleic acid, malic acid, tartaric acid, citric acid, ammonium phosphates, alkali metal phosphates, paratoluene sulfonic acid, and combinations thereof. The catalyst is preferably paratoluene sulfonic acid. For example, the catalyst may be WILLAMETTE A catalyst, which is a blocked paratoluene sulfonic acid catalyst.

The catalyst may be contained in the coating composition in the amount of 0-5 wt %. Preferably, the catalyst may be contained in the coating composition in the amount of 1-2 wt %. More preferably, the catalyst may be contained in the coating composition in the amount of 1.3-1.5 wt %.

Chlorinated Paraffins

The chlorinated paraffins add water resistance and additional fire resistance. For example, the chlorinated paraffins may be DOVERSPERSE A1 chlorinated paraffins.

The chlorinated paraffins may be contained in the coating composition in the amount of 0-20 wt %. Preferably, the chlorinated paraffins may be contained in the coating composition in the amount of 5-15 wt %. More preferably, the chlorinated paraffins may be contained in the coating composition in the amount of 9-10 wt %.

Other Components

The coating composition may also include a latex.

The coating composition may also include a thickener. For example, the thickener may be silica.

The coating composition may also include water. The water may be contained in the coating composition in an amount of 0-50 wt %. Preferably, the water may be contained in the coating composition in an amount of 5-25 wt %. More preferably, the water may be contained in the coating composition in an amount of 14-16 wt %.

Overlay

This invention is also directed to an overlay for applying to a wood substrate. The overlay includes a core layer comprising a substrate and a resin composition, a top layer on one side of the core layer comprising the fire retardant intumescent coating composition described above, and an optional bottom layer on the opposite side of the core layer from the top layer.

The substrate to which the coating is applied also influences the performance of the product. The core layer substrate may be a lignocellulosic material, a glass substrate, or a clay substrate. The glass substrate may include fillers such as N600 ceramic microspheres, expandable graphite, DURALUM fused brown aluminum oxide, and combinations thereof. The lignocellulosic material may be paper wherein the paper is impregnated with the resin composition. The glass substrate may be a glass mat saturated with the resin composition. The resin composition may be a phenolic resin or an acrylic resin. A cost effective substrate is a paper treated with a phenolic or acrylic resin. The saturated paper sheet is cured in an oven prior to the application of the 200-220 gsm dry graphite coating, best applied in two coats.

Other examples of lignocellulosic materials include materials comprised of cellulose, hemicellulose, and lignin. Such materials include solid lumber, laminated veneer lumber, parallel strand lumber, timber strands, plywood, medium density fiberboard (MDF), hardboard, particleboard, oriented strand board (OSB), and strawboard.

The bottom layer of the overlay may have an adhesive for binding the overlay to the wood substrate. The adhesive is preferably sufficient to adhere to the overlay throughout the fire test. The adhesive may be a phenolic glue. A two part polyvinyl acetate (PVA) with 5% ammonium chloride is preferred as the adhesive.

The weight of the top coating may be 50-300 gsm. Preferably, the weight of the coating may be 150-220 gsm. More preferably, the weight of the coating may be 150 gsm. The top layer may have at least 100 gsm expandable graphite as measured when the top layer is dry. At lower coat weights, the overlay tends to crack when exposed to a flame for an extended period of time. The cracks provide an opening for the flame, reducing the fire resistance of the product. A preferred dry coating weight of target of 200 gsm, typically applied using two coats, provides better substrate protection.

For more demanding applications, applying the graphite coating to a glass substrate, such as a glass mat, is preferred. In a preferred embodiment, the glass mat is formed of fiberglass ranging from 0.5-3.0 lb/100 ft$^2$. More preferred, the glass mat is about 1.5 lb/100 ft$^2$. The glass is saturated in acrylic or phenolic resin, and the graphite coating is applied to the cured resin saturated glass mat. The coating is cured in an oven to make a product that can be factory bonded to a wood substrate with an adhesive. The adhesive is sufficient to adhere to the overlay throughout the fire test. The adhesive may be a phenolic glue. A two part polyvinyl acetate (PVA) with 5% aluminum chloride is preferred. When exposed to a flame for an extended period of time, the overlay does not crack, providing maximum fire resistant performance.

Process of Forming the Overlay

This invention is also directed to a process of forming the overlay described above. The process involves a step of applying a resin composition to the core layer substrate described above to form a resinated core layer and a step of applying the coating composition described above on the resinated core layer, directly or indirectly, to form the top layer.

The resinated core layer may be formed by impregnating paper with a resin composition comprising at least one selected from the group consisting of a phenolic resin and an acrylic resin or by saturating a glass mat with a resin composition comprising at least one selected from the group consisting of a phenolic resin and an acrylic resin.

The top layer may have a dry coating weight of at least 100 gsm. Preferably, the top layer may have a dry coating weight of about 180-220 gsm. More preferably, the top layer may have a dry coating weight of about 200 gsm.

Construction Material

This invention is also directed to a construction material for a building or a dwelling comprising a wood substrate that is in direct contact with the overlay described above. The overlay described above can be used as a sheathing for a substrate, as a firewall, or as a roofing deck for multifamily or commercial construction. The overlay can be applied to substrates such as oriented strandboard (OSB) and plywood. The overlay could also be used as web stock for I-beams.

The overlay can be applied to the wood substrate with an adhesive on the bottom layer of the overlay or by applying an adhesive on the wood substrate prior to applying the overlay. The adhesive may be a phenolic glue. A two part polyvinyl acetate (PVA) with 5% aluminum chloride is preferred. Catalysts other than the 5% aluminum chloride may also be used. The wet adhesive may be applied at a rate of 12 g per square foot with a glue spreader. As the adhesive dries, the adhesive bonds the overlay to the wood substrate.

EXAMPLES

Example 1

This example shows the use of an impregnated paper as the core layer.

A paper impregnated with an acrylic resin, Arjofinish-100-HS-Gold (ArjoWiggins), having a weight of 65 lb/100 ft$^2$ was used as the core layer.

A composition for the top layer was made from a 35.3 wt % primer (211.8 g), 35.3 wt % melamine formaldehyde resin (211.8 g), 1.1 wt % acid catalyst (6.6 g), 22.2 wt % expandable graphite (SYZR 1002) (133.2 g) and 6.2 wt % water (37.2 g). While mixing the primer, melamine formaldehyde resin and water, the graphite was added. The mixture was stirred in a shear mixer as the catalyst was added.

The top layer composition was coated on the Arjofinish-100-HS-Gold paper.

The overlay was adhesively bonded to an OSB board through a bottom layer formed of a polyvinyl acetate and ammonium chloride catalyst.

Example 2

This example shows the use of a glass mat as the core layer.

A glass mat (Owens Corning) having a weight of 1.5 lb/100 ft$^2$ was saturated with Hycar 26391 (an acrylic resin) to give a dry weight of 75.7 wt %.

The compositions for the top layer and the bottom layer as described in Example 1 above were used with the glass mat core layer.

Flame Retardancy Test for Examples 1-2

Both Examples 1 and 2 were tested for flame retardancy using a small scale tunnel test (ASTM D3806-98). A cement board was used to calibrate the zero flame spread and a red oak board was used in the calibration and its flame spread was given a value of 100. The results are shown in Table 2 and are based on a 4 minute burn time.

TABLE 2

|  | Flame Spread Rating |
|---|---|
| Example 1 | 6 |
| Example 2 | 8 |

As shown in Table 2, the overlay had excellent intumescent flame retardancy for both the impregnated paper core layer as well as the saturated glass mat core layer.

Example 3

An Owens Corning coated fiberglass mat (Product Code 458793 VL 3551) was used as the core layer.

A composition for the top layer was made from 44.05 wt % melamine formaldehyde resin (R4349), 15.70 wt % water, 3.16 wt % morpholine, 16.42 wt % APP, 1.48 wt % WIL-LAMETTE A paratoluene sulfonic acid catalyst, and 19.19 wt % expandable graphite (SYZR 1002). While mixing the melamine formaldehyde resin, water, morpholine, and APP, the expandable graphite was added. The mixture was stirred in a shear mixer as the catalyst was added.

The top layer composition was coated on the Owens Corning coated fiberglass mat with a coat weight of 150 gsm. The composition was dried for 10 minutes at 100° F. and cured for 2 minutes at 300° F.

The overlay was adhesively bonded to an OSB board (LP 7/16" OSB sheathing from Fort St. John, BC) through a bottom layer formed of a polyvinyl acetate and ammonium chloride catalyst (Specialty Polymers WB2823LV PVA with C-100Y Ammonium Chloride catalyst—5 grams of C-100Y Ammonium Chloride catalyst per 100 grams of WB2823LV PVA). The adhesive was applied to the OSB first using a Mayer rod. The overlay was then applied to the OSB and smoothed with a rubber roller. The resulting panel was then cold pressed at 62 psi for 1 hour and then post cured at 95° F. for 16 hours.

Comparative Example 1

A panel was made in the same way as Example 3 except that the amount of expandable graphite in the top layer composition was changed to 0 wt %. As such, the top layer composition was coated on the Owens Corning coated fiberglass mat with a coat weight of 105 gsm due to the lack of expandable graphite.

Comparative Example 2

A panel was made in the same way as Comparative Example 1 except that the top layer composition was coated on the Owens Corning coated fiberglass mat with a coat weight of 150 gsm. In order to achieve this coat weight, a second coat of the top layer composition had to be applied to the Owens Corning coated fiber glass mat along with a second drying step for 10 minutes at 100° F.

Flame Retardancy Test for Example 3 and Comparative Examples 1-2

Example 3 and Comparative Examples 1-2 were tested for flame retardancy using a small scale tunnel test (ASTM D3806-98). A cement board was used to calibrate the zero flame spread and a red oak board was used in the calibration and its flame spread was given a value of 100. The results are shown in Table 3.

TABLE 3

| Sample | Flame Position (in) | | | Flame Spread Rating | | |
|---|---|---|---|---|---|---|
| | 4 min | 10 min | 30 min | 4 min | 10 min | 30 min |
| Example 3 | 4.4 | 5.2 | 5.8 | 2 | 11 | 17 |
| Comparative Example 1 | 5.0 | 5.3 | 6.1 | 9 | 12 | 21 |
| Comparative Example 2 | 5.0 | 5.6 | 6.1 | 9 | 16 | 21 |

The above samples had no after flame and no after glow. Example 3 had no visible cracks, some delamination, 1/4" intumescent height, and 1/4" char depth. Comparative Examples 1 and 2 had no visible cracks, some delamination, no intumescence, and charred through the board.

As shown in Table 3, the overlay of this invention had excellent intumescent flame retardancy. Without the expandable graphite, Comparative Examples 1-2 had inferior intumescent flame retardancy.

Example 4

An Owens Corning coated fiberglass mat (Product Code 458793 VL 3551) was used as the core layer.

A composition for the top layer was made from 44.05 wt % melamine formaldehyde resin (R4349), 15.70 wt % water, 3.16 wt % morpholine, 16.42 wt % APP, 1.48 wt % WILLAMETTE A paratoluene sulfonic acid catalyst, 19.19 wt % expandable graphite (SYZR 1002), and 2.50 wt % DOVERSPERSE A1 chlorinated paraffins. The water and morpholine were added to the melamine formaldehyde resin. Then, the expandable graphite was added. Then, the APP was added. The catalyst was added next. The chlorinated paraffins were added last. The coating was stirred after each addition.

The top layer composition was coated on the Owens Corning coated fiberglass mat. The composition was dried for 2 minutes and 15 seconds at 300° F.

One overlay was applied as is to an OSB board as described below. Another overlay was first soaked for 24 hours in water and then dried. There was noticeable APP extractive on the overlay after soaking. The overlay exhibited the typical color change in the area tested when the area had dried.

The overlay was adhesively bonded to an OSB board (LP 7/16" OSB sheathing from Fort St. John, BC) through a bottom layer formed of a polyvinyl acetate and ammonium chloride catalyst (Specialty Polymers WB2823LV PVA with C-100Y Ammonium Chloride catalyst—5 grams of C-100Y Ammonium Chloride catalyst per 100 grams of WB2823LV PVA). The adhesive was applied to the OSB first using a Mayer rod. The overlay was then applied to the OSB and smoothed with a rubber roller. The resulting panel was then cold pressed at 63 psi for 1 hour and then post cured at 95° F. for 16 hours.

Each overlay was checked for water resistance using a water rub test. All of the overlays exhibited good water rub with no softening of the coating. The overlays did exhibit the typical color change in the area tested when the area had dried.

Example 5

A panel was made in the same way as Example 4 except that the amount of chlorinated paraffins was changed to 5.00 wt %.

Example 6

A panel was made in the same way as Example 4 except that the amount of chlorinated paraffins was changed to 10.00 wt %.

Example 7

A panel was made in the same way as Example 6 except that the amount of APP was changed to 11.42 wt %.

Flame Retardancy Test for Examples 4-7

Examples 4-7 were tested for flame retardancy using a small scale tunnel test (ASTM D3806-98). A cement board was used to calibrate the zero flame spread and a red oak board was used in the calibration and its flame spread was given a value of 100. The results are shown in Table 4.

TABLE 4

| Sample | Flame Position (in) | | | Flame Spread Rating | | |
|---|---|---|---|---|---|---|
| | 4 min | 10 min | 30 min | 4 min | 10 min | 30 min |
| Example 4 as is | 4.1 | 4.6 | 6.3 | −1 | 5 | 23 |
| Example 4-24 hr soak | 4.9 | 6.0 | 6.0 | 8 | 20 | 20 |
| Example 5 as is | 4.4 | 5.0 | 5.2 | 2 | 9 | 11 |
| Example 5-24 hr | 5.8 | 7.3 | — | 17 | 34 | — |

TABLE 4-continued

| Sample | Flame Position (in) | | | Flame Spread Rating | | |
|---|---|---|---|---|---|---|
| | 4 min | 10 min | 30 min | 4 min | 10 min | 30 min |
| soak | | | | | | |
| Example 6 as is | 4.5 | 5.0 | 5.4 | 3 | 9 | 13 |
| Example 6-24 hr soak | 4.8 | 5.5 | 5.5 | 6 | 14 | 14 |
| Example 7 as is | 4.6 | 5.1 | 5.5 | 5 | 10 | 14 |
| Example 7-24 hr soak | 4.7 | 7.5 | — | 5 | 36 | — |

The above samples had no after flame and no after glow. Example 4 (both "as is" and "24 hr soak") had no visible cracks, some delamination, and charring broke through the OSB. Example 5 "as is" had no visible cracks, some delamination, and moderate OSB charring. Example 5 "24 hr soak" had no visible cracks and no delamination. Example 6 (both "as is" and "24 hr soak") had no visible cracks, some delamination, and charring broke through the OSB. Example 7 "as is" had no visible cracks, some delamination, and deep OSB charring. Example 7 "24 hr soak" had no visible cracks and no delamination.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An overlay for applying to a wood substrate, comprising a core layer comprising a substrate and a resin composition,
a top layer on one side of the core layer comprising a fire retardant intumescent coating composition, and
an optional bottom layer on the opposite side of the core layer from the top layer;
wherein the fire retardant intumescent coating composition comprises expandable graphite, an aromatic polyamine resin, morpholine, a catalyst, and ammonium polyphosphate; and
wherein the expandable graphite is present in a concentration of 10-50 wt %; wherein the aromatic polyamine resin is present in a concentration of 20-60 wt %; wherein the morpholine is present in a concentration of 2-6 wt %; wherein the catalyst is present in a concentration of 1-5 wt %; wherein the ammonium polyphosphate is present in a concentration of 1-30 wt %; and wherein the core layer substrate is a lignocellulosic material or a glass substrate.

2. The overlay of claim 1, wherein the coating composition further comprises a latex.

3. The overlay of claim 1, wherein the aromatic polyamine resin is a melamine resin.

4. The overlay of claim 1, wherein the catalyst is paratoluene sulfonic acid.

5. The overlay of claim 1, wherein the expandable graphite comprises particles that can pass through a 500 mesh screen.

6. The overlay of claim 1, wherein the expandable graphite comprises particles that can pass through a 50 mesh screen.

7. The overlay of claim 1, wherein the expandable graphite has an expansion volume of at least 15 mL/g.

8. The overlay of claim 1, wherein the expandable graphite has an expansion volume of 100-500 mL/g.

9. The overlay of claim 1, wherein the expandable graphite has an expansion volume of 100-200 mL/g.

10. The overlay of claim 1, wherein the aromatic polyamine resin is present in a concentration of about 40-45 wt %.

11. The overlay of claim 1, wherein the expandable graphite is present in a concentration of about 15-25 wt %.

12. The overlay according to claim 1, wherein the core layer substrate is the lignocellulosic material; the lignocellulosic material is paper; and the paper is impregnated with the resin composition which comprises at least one selected from the group consisting of a phenolic resin and an acrylic resin.

13. The overlay according to claim 1, wherein the core layer is a glass mat saturated with the resin composition which comprises at least one selected from the group consisting of a phenolic resin and an acrylic resin.

14. The overlay according to claim 1, wherein the bottom layer is an adhesive for binding to the wood substrate.

15. The overlay according to claim 1, wherein the top layer has at least 150 gsm graphite as measured when the top layer is dry.

16. The overlay according to claim 1, wherein the top layer has about 200-220 gsm graphite as measured when the top layer is dry.

17. A process of forming the overlay according to claim 1, comprising:
applying the resin composition to the core layer substrate to form a resinated core layer,
applying a coating composition on the resinated core layer, directly or indirectly, to form the top layer and optionally applying a bottom layer on the opposite side of the core layer from the top layer;
wherein the coating composition comprises expandable graphite, an aromatic polyamine resin, morpholine, a catalyst, and ammonium polyphosphate;
wherein the expandable graphite is present in a concentration of 10-50 wt %;
wherein the aromatic polyamine resin is present in a concentration of 20-60 wt %;
wherein the morpholine is present in a concentration of 2-6 wt %;
wherein the catalyst is present in a concentration of 1-5 wt %;
wherein the ammonium polyphosphate is present in a concentration of 1-30 wt %;
and wherein the core layer substrate is a lignocellulosic material or a glass substrate.

18. The process according to claim 17, wherein the resinated core layer is formed by impregnating paper with a resin composition comprising at least one selected from the group consisting of a phenolic resin and an acrylic resin.

19. The process according to claim 17, wherein the resinated core layer is formed by saturating a glass mat with a resin composition comprising at least one selected from the group consisting of a phenolic resin and an acrylic resin.

20. The process according to claim 17, wherein the top layer has a dry coating weight of at least 100 gsm.

21. The process according to claim 17, wherein the top layer has a dry coating weight of about 200 gsm.

22. A construction material for a building or dwelling, comprising:
a wood substrate in direct contact with the overlay of claim 1.

* * * * *